(12) United States Patent
O'Banion et al.

(10) Patent No.: US 7,008,157 B2
(45) Date of Patent: Mar. 7, 2006

(54) EXPLOSIVE ASSISTED EXPANDING FASTENER

(75) Inventors: Michael L. O'Banion, Westminster, MD (US); William Sauerwein, Phoenix, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/177,003

(22) Filed: Jun. 21, 2002

(65) Prior Publication Data

US 2003/0017029 A1  Jan. 23, 2003

Related U.S. Application Data

(60) Provisional application No. 60/299,950, filed on Jun. 21, 2001.

(51) Int. Cl.
*F16B 13/04* (2006.01)

(52) U.S. Cl. .................. 411/20; 411/501; 411/508; 411/440; 411/19

(58) Field of Classification Search .............. 411/20, 411/45, 46, 349, 553, 19, 501, 508; 94/60.1, 94/60.3, 549, 550, 551, 553
See application file for complete search history.

(56) References Cited

U.S. PATENT DOCUMENTS

| | | | |
|---|---|---|---|
| 1,444,618 A | 2/1923 | Levingston | |
| 1,912,222 A | 5/1933 | Heyman | |
| 2,006,813 A | 7/1935 | Norwood | |
| 2,178,187 A | 10/1939 | Sake | |
| 2,378,118 A * | 6/1945 | Widrich | 411/20 |
| 2,410,047 A * | 10/1946 | Burrows et al. | 29/421.1 |
| 2,429,239 A * | 10/1947 | Rogers | 411/20 |
| 2,944,262 A | 7/1960 | Richman et al. | |
| 2,994,243 A | 8/1961 | Stroth | |
| 3,322,017 A | 5/1967 | Dufficy | |
| 3,332,311 A * | 7/1967 | Schultz | 411/20 |
| 3,548,705 A * | 12/1970 | Nasser | 411/80.1 |
| 3,722,280 A | 3/1973 | Van Greuingen | |
| 3,882,755 A | 5/1975 | Enstrom | |
| 3,925,875 A | 12/1975 | Doke | |

(Continued)

FOREIGN PATENT DOCUMENTS

DE  155 135 C  10/1904

(Continued)

OTHER PUBLICATIONS

International Search Report for PCT/US02/19627 mailed Sep. 16, 2002.

(Continued)

*Primary Examiner*—Katherine Mitchell
(74) *Attorney, Agent, or Firm*—Harness, Dickey & Pierce, P.L.C.

(57) ABSTRACT

An explosive assisted fastener for joining steel framing members. The fastener is comprised of an integrally formed member having a head section, a stem section and a tip section, such that the head section is disposed at a first end of the stem section and adapted to be linearly driven by a driving device into the framing members, and the tip section is disposed at a distal second end of the stem section and adapted to penetrate the framing members. The fastener further includes an explosive material embedded in the tip section of the fastener. In operation, the fastener is driven through the framing members until the head section of the fastener seats against an outer surface of the framing members. Once driven into place, the explosive material residing in the fastener is detonated, thereby radially expanding the tip section of the fastener and preventing removal of the fastener from the framing members.

18 Claims, 7 Drawing Sheets

U.S. PATENT DOCUMENTS

| | | | |
|---|---|---|---|
| 4,025,029 A * | 5/1977 | Kotas et al. | 227/10 |
| 4,183,239 A | 1/1980 | Stubbings | |
| 4,218,953 A | 8/1980 | Haytayan | |
| 4,402,641 A | 9/1983 | Arff | |
| 4,511,296 A * | 4/1985 | Stol | 411/20 |
| 4,601,625 A | 7/1986 | Ernst et al. | |
| 4,708,552 A | 11/1987 | Bustos et al. | |
| 4,787,795 A | 11/1988 | Kraus | |
| 4,810,150 A | 3/1989 | Matsukane et al. | |
| 4,840,523 A | 6/1989 | Oshida | |
| 4,902,182 A | 2/1990 | Lewis | |
| 5,030,051 A | 7/1991 | Kaneko et al. | |
| 5,207,750 A | 5/1993 | Rapata | |
| 5,240,361 A | 8/1993 | Armstrong et al. | |
| 5,253,965 A | 10/1993 | Angel | |
| 5,259,689 A | 11/1993 | Arand et al. | |
| 5,323,632 A | 6/1994 | Shirasaka et al. | |
| 5,333,483 A | 8/1994 | Smith | |
| 5,375,957 A | 12/1994 | Golledge | |
| 5,376,097 A | 12/1994 | Phillips | |
| 5,567,101 A | 10/1996 | Martin | |
| 5,658,110 A | 8/1997 | Kraus | |
| 5,718,142 A | 2/1998 | Ferraro | |
| 5,775,860 A | 7/1998 | Meyer | |
| 5,829,817 A | 11/1998 | Ge | |
| 5,855,099 A | 1/1999 | Hoffman | |
| 6,023,898 A | 2/2000 | Josey | |
| 6,273,656 B1 | 8/2001 | Cleland et al. | |
| 6,276,644 B1 | 8/2001 | Jennings et al. | |
| 6,354,683 B1 * | 3/2002 | Benbow | 312/334.7 |
| 2002/0071741 A1 * | 6/2002 | Oswald | 411/453 |

FOREIGN PATENT DOCUMENTS

| | | | |
|---|---|---|---|
| DE | 308 681 C | | 10/1918 |
| DE | 369395 | * | 10/1921 |
| DE | 2557845 A1 | * | 6/1977 |
| DE | 31 47 430 A | | 6/1983 |
| DE | 199 34 998 A | | 2/2001 |
| FR | 2 595 609 | | 9/1987 |
| FR | 2651283 | * | 8/1989 |
| FR | 2745863 | * | 3/1996 |
| GB | 608 373 A | | 9/1948 |
| WO | WO 92 03664 A | | 3/1992 |
| WO | WO 01 38746 A | | 5/2001 |
| WO | WO 01 65125 A | | 9/2001 |
| WO | WO 03/001075 | * | 1/2003 |

OTHER PUBLICATIONS

Patent Abstracts of Japan, vol. 009, No. 046 (M-360) JP 59 185529 A, Feb. 1985, Japan.

* cited by examiner

EXPLOSIVE ASSISTED EXPANDING FASTENER

CROSS-REFERENCE TO RELATED APPLICATIONS

This application claims the benefit of U.S. Provisional Application No. 60/299,950, filed Jun. 21, 2001.

BACKGROUND OF THE INVENTION

The present invention relates generally to steel framing and, more particularly, to an improved cost-effective method for fastening steel framing.

Steel framing is revolutionizing the construction industry. Steel is a high quality framing material that will not shrink, warp, or attract termites and other wood boring insects. In recent years, the price of steel has become more competitive with wood and other construction materials. However, despite its advantages, steel framing has not become prevalent in the residential construction industry. The lack of a quick and cost effective technique for fastening steel members has prevented steel framing from emerging as the predominant building material in residential construction.

Therefore, it is desirable to provide a quick and cost-effective technique for fastening steel members. It is envisioned that the steel fastening technique will be comparable in speed to an air nailer used to fasten wood materials. It is further envisioned that the steel fastening technique will provide a minimal gap between steel members, a pullout force of at least 216 lb., a shear force of at least 164 lb., as well as cause minimal destruction of any galvanize coating on the steel members.

SUMMARY OF THE INVENTION

In accordance with the present invention, an explosive assisted fastener is provided for joining steel framing members. The fastener is comprised of an integrally formed member having a head section, a stem section and a tip section, such that the head section is disposed at a first end of the stem section and adapted to be linearly driven by a driving device into the framing members, and the tip section is disposed at a distal second end of the stem section and adapted to penetrate the framing members. The fastener further includes an explosive material embedded in the tip section of the fastener. In operation, the fastener is driven through the framing members until the head section of the fastener seats against an outer surface of the framing members. Once driven into place, the explosive material residing in the fastener is detonated, thereby radially expanding the tip section of the fastener and preventing removal of the fastener from the framing members.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

Figure 1:
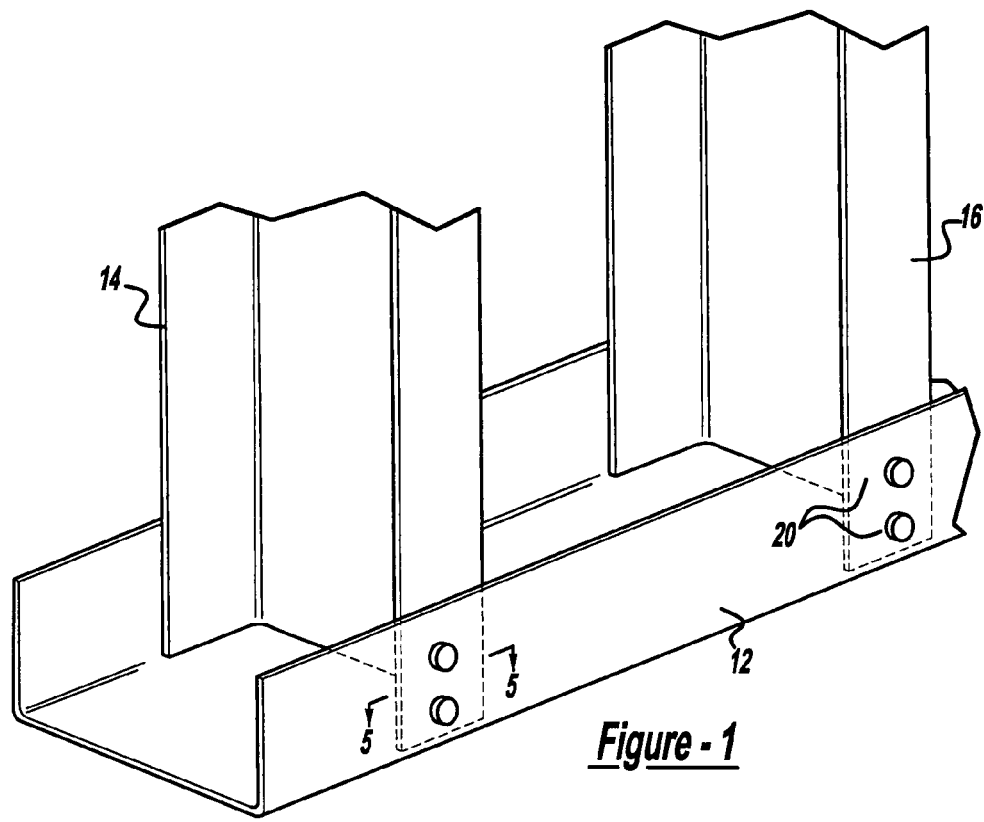
FIG. 1 is a fragmentary prospective view of a steel framing member having two additional steel framing members fastened thereto in accordance with the present invention.

Referring to FIG. 1, a fragmentary prospective view of a longitudinal steel framing member 12 having two upright steel framing members 14 and 16 fastened thereto. Each c-shaped framing member includes a bottom wall and two side walls having a thickness in the range from 0.018" to 0.071". Additionally, each steel member may range from 33 ksi to 80 ksi as is well known in the art. As will be more fully described below, one or more fasteners 20 may be used to join the upright steel framing members 14 and 16 to the longitudinal steel framing member 12. While the following description is provided with reference to this particular configuration, it is readily understood that the fastening technique of the present invention is applicable to any two or more adjacent members made of steel (e.g., carbon steel, hardened steel, stainless steel, tool steel, etc.) or other material having similar attributes to those of steel (e.g., nonferrous metals, including nickel, alloys, titanium, copper and aluminum).

Figure 2:
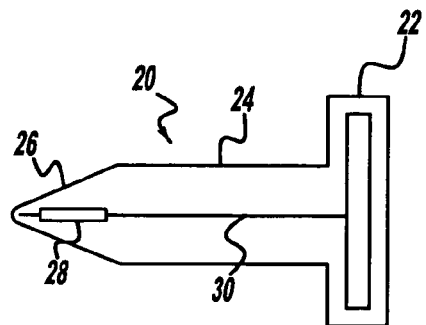
FIG. 2 is a side view of a first preferred embodiment of an explosive assisted fastener in accordance with the present invention.

In accordance with the present invention, one or more explosive assisted fasteners 20 may be used to join the steel members. A first exemplary embodiment of an explosive assisted fastener 20 is depicted in FIG. 2. The fastener 20 is comprised of an integrally formed member having a head section 22, a stem section 24 and a tip section 26. The fastener 20 is preferably comprised of a harded steel material or, alternatively, a softer steel material having a tip section formed of a harded material such as carbide, ceramic, or a harden steel. In addition, a small explosive charge 28 is embedded in either the tip section 26 or the stem section 24 of the fastener 20. It is envisioned that barium styphnate, nitro cellulose, or other known explosive materials which are commonly electrically detonated may be used for the explosive charge 28.

Figure 3:
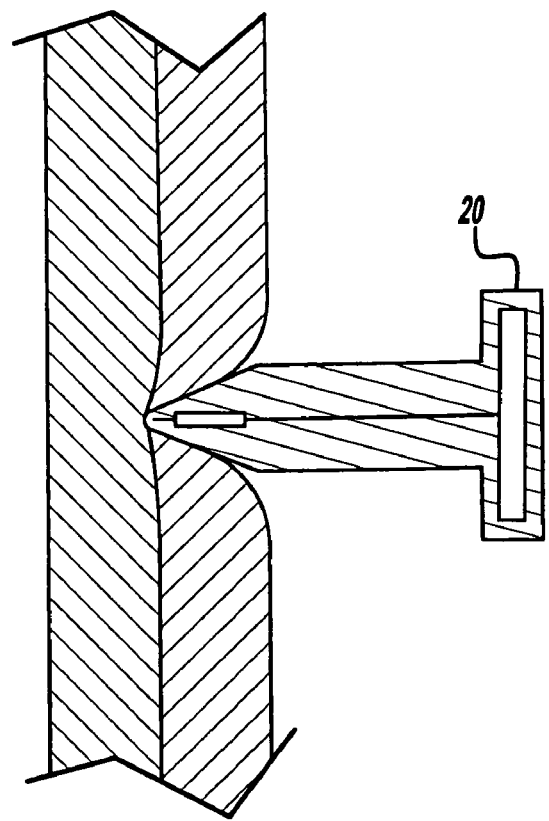
FIGS. 3 and 4 are cross-sectional views, taken along line 5—5 of FIG. 1, illustrating the explosive assisted fastener being driven through the steel members in accordance with the present invention.
Figure 4:
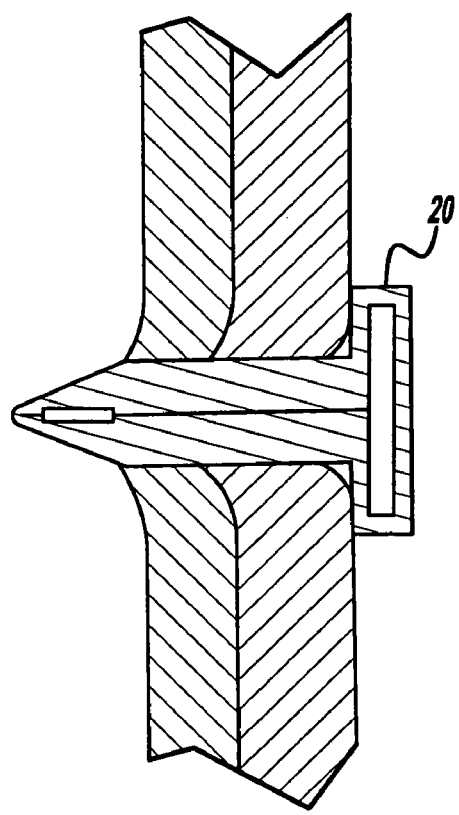

In operation, a two-step process is used to set the fastener 20. First, the fastener 20 is driven into the steel members until the head of the fastener seats against the outer surface of the steel members as shown in FIGS. 3 and 4. It is readily understood that the driving device is configured to engage the head section 22 of the fastener and may provide a back plate to prevent unwanted deformation of the steel members at the point at which the fastener pierces the steel members. In one embodiment, the driving device drives the fasteners at relatively high speeds (e.g., greater than 50 feet per second). In an alternative embodiment, the driving device may drive the fastener at lower speeds, but apply a relatively high force. One skilled in the art will readily recognize that an air nailer or other known driving devices may be configured to drive the fasteners 20 of the present invention into the steel members.

Figure 5:
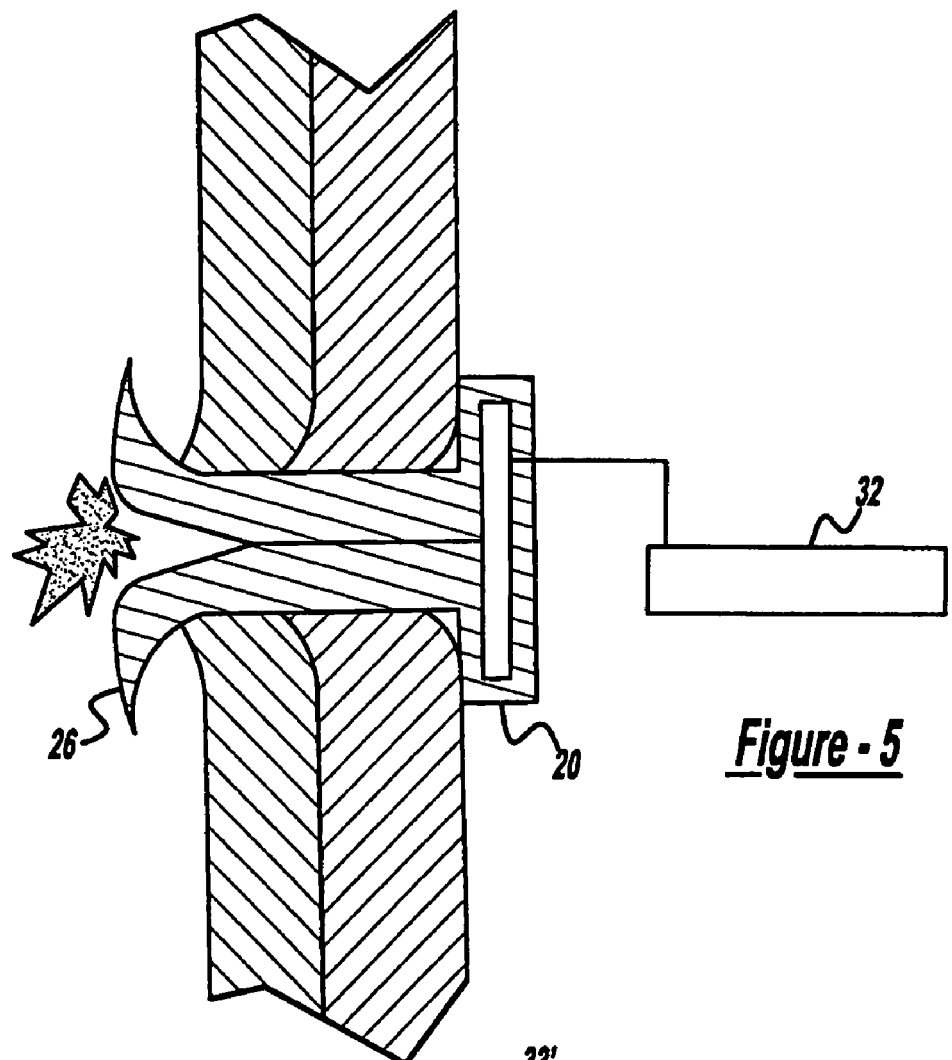
FIG. 5 is a cross-sectional view, taken along line 5—5 of FIG. 1, illustrating detonation of explosive material embedded in the explosive assisted fastener in accordance with the present invention.
Figure 6:
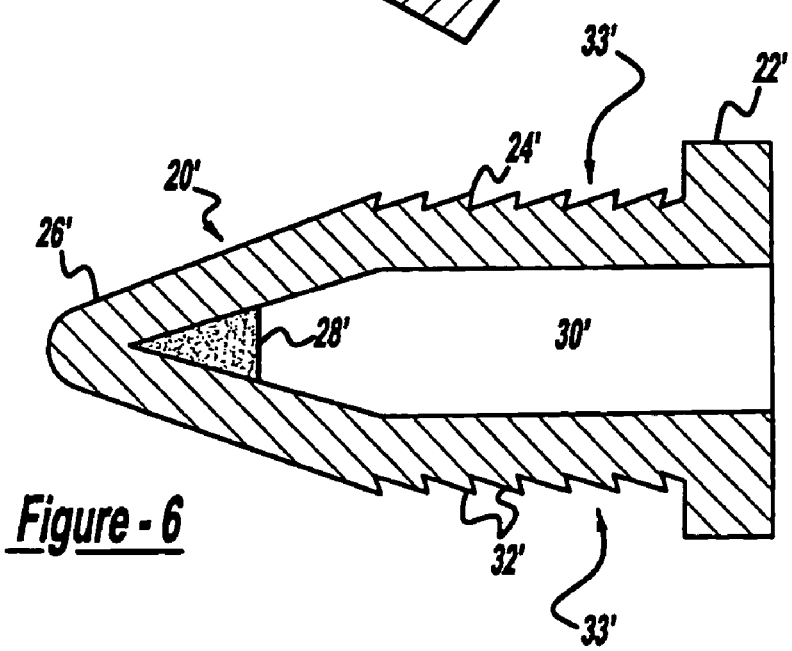
FIG. 6 is a side view of a second preferred embodiment of an explosive assisted fastener in accordance with the present invention.

Once the fastener 20 is driven into place, the embedded explosive charge 28 is detonated, thereby outwardly expanding the tip section 26 of the fastener 20. Referring to FIG. 5, the radially flared tip section 26 engages the underside of the steel members, thereby preventing removal of the fastener from the steel members. To detonate the explosive charge 28, a thin copper wire or other electrical conducting material 30 may be embedded in the fastener 20. The wire 30 is externally accessible via the head section 22 of the fastener and extends through the stem section 24 to electrically couple to the explosive material 28 embedded in the fastener 20. An external detonating device 32 electrically connected to the wire 30 may be used to detonate the explosive material 28. It is readily understood that the detonating device 32 may be associated with and cooperatively operable with the driving device used to drive the fastener into the steel members A second exemplary embodiment of an explosive assisted fastener 20' is depicted in FIG. 6. Similarly, the fastener 20' is comprised of an integrally formed member having a head section 22', a stem section 24', a tip section 26', and an embedded explosive material 28'. In this embodiment, the explosive material 28' may be one of many commercially available mechanically detonated materials, such as lead styphate, lead azide or a combination thereof. The fastener 20' is further defined to include a circular bore 30' which is formed in the head section 22' of the fastener 20'. The bore 30' extends downwardly through the stem section 24' and then tapers inwardly to mimic the outer shape of the tip section 26'. As will be more fully explained below, the bore 30' is adapted to receive a pin therein.

Figure 8:
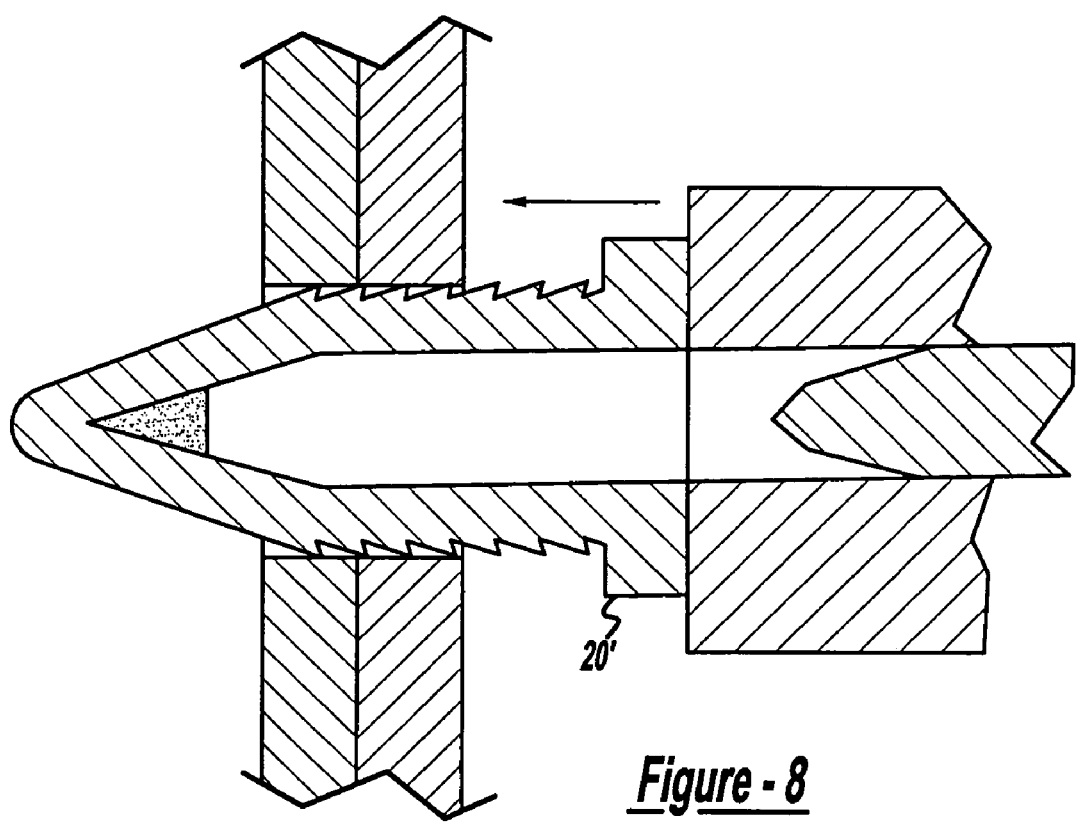
FIG. 8 is a cross-sectional view, taken along line 5—5 of FIG. 1, illustrating the second preferred embodiment of an explosive assisted fastener penetrating partially through the steel members in accordance with the present invention.
Figure 9:
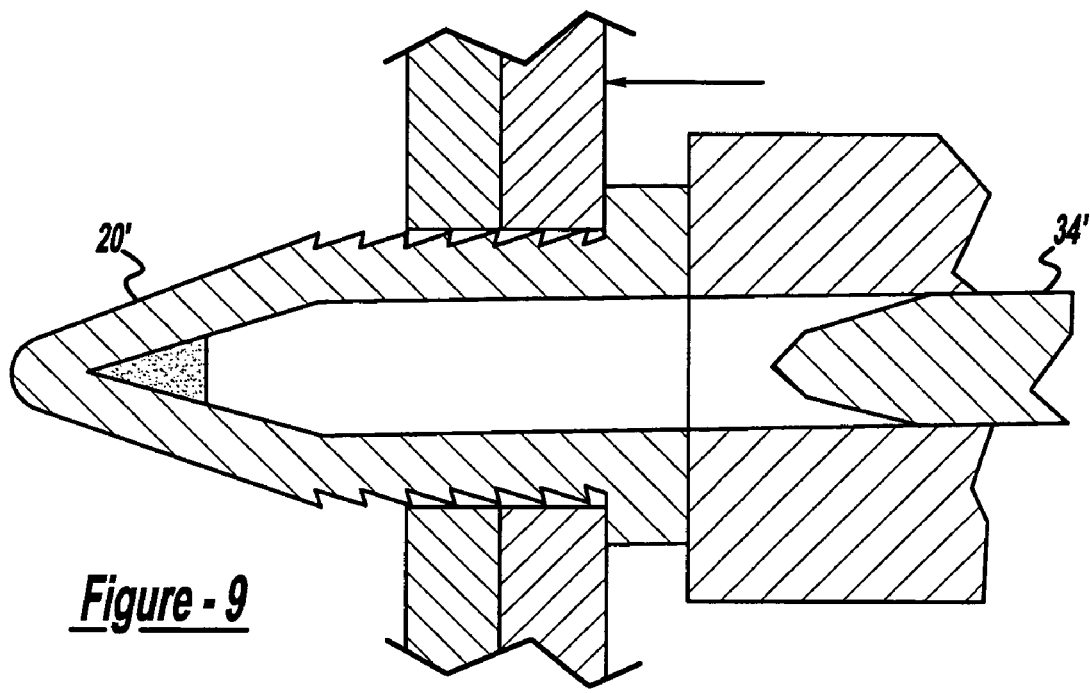
FIG. 9 is a cross-sectional view, taken along line 5—5 of FIG. 1, illustrating the second preferred embodiment of an explosive assisted fastener being driven against the outer surface of the steel members in accordance with the present invention.
Figure 10:
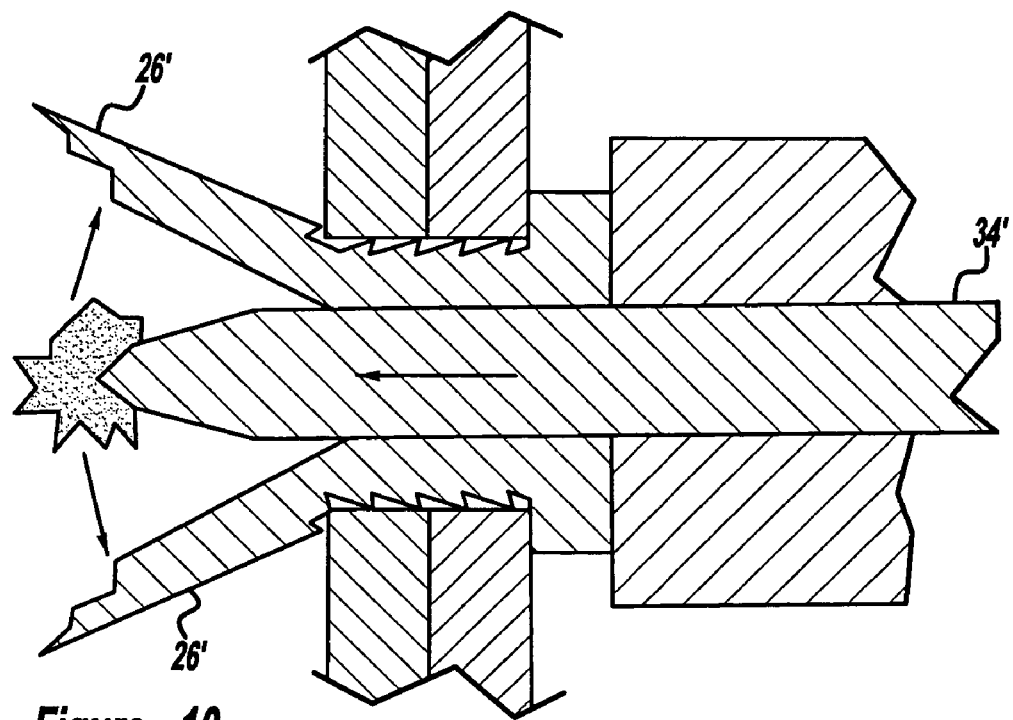
FIG. 10 is a cross-sectional view, taken along line 5—5 of FIG. 1, illustrating a pin being driven into a bottom portion of the second preferred embodiment of an explosive assisted fastener in accordance with the present invention.

In operation, the expanding fastener 20' is driven into the steel members until the head of the fastener seats against the outer surface of the steel members as shown in FIGS. 8 and 9. Once the fastener 20 has been driven into place, the embedded explosive material 28' may be mechanically detonated as shown in FIG. 10. For instance, a pin 34' may be driven into the bore 30' and into contact with the explosive material 28' residing in the tip section 26' of the fastener. The impact force of the pin 34' detonates the explosive material 28'. It is envisioned that the pin 34' may be integrated into the driving device that drives the fastener 20' into the steels members. In other words, the driving device may be configured to provide a two-step actuator: a first step for driving the fastener into the steel members, and a second step for driving the pin 34' into contact with the explosive material.

Figure 7:
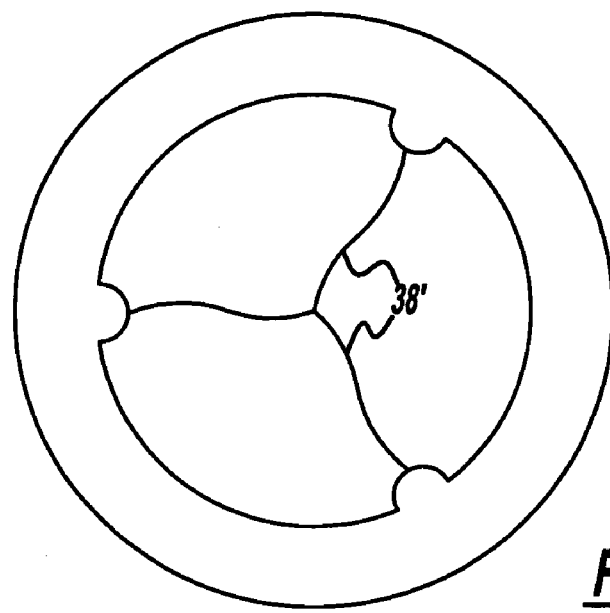
FIG. 7 is a bottom view of the second preferred embodiment of the explosive assisted fastener in accordance with the present invention.

As a result, a portion of the fastener extending beyond the underside of the steel members expands radially outward as best seen in FIG. 10. The radially flared portions of the tip section 26' prevents removal of the fastener from the steel members. To facilitate flaring, one or more fracture lines 38' may be formed in the tip section 26' of the fastener 20' as depicted in FIG. 7. It is envisioned that the fracture lines may not extend to the distal end of the tip section 26', thereby maintaining the structural integrity of the tip section 26'. It is further envisioned that a plurality of raised ridges 32', formed by annular grooves 33', may extend outwardly from the outer surface of the stem section 24' to further prevent removal of the fastener from the steel members.

Alternatively, the explosive material 28' may be detonated upon impact of the fastener with the outer surface of the steel framing members. In this case, the fastener 20' is similarly driven into the steel members until the head section of the fastener seats against the outer surface of the steel members. Although the explosive material 28' is detonated upon impact of the tip section 26' with the framing members, the burn time of the explosive material 28' is configured such that the outward expansion of the tip section 26' does not occur until it extends beyond the underside of the steel members. As described above, the radially flared portions of the tip section 26' prevents removal of the fastener from the steel members.

Figure 11:
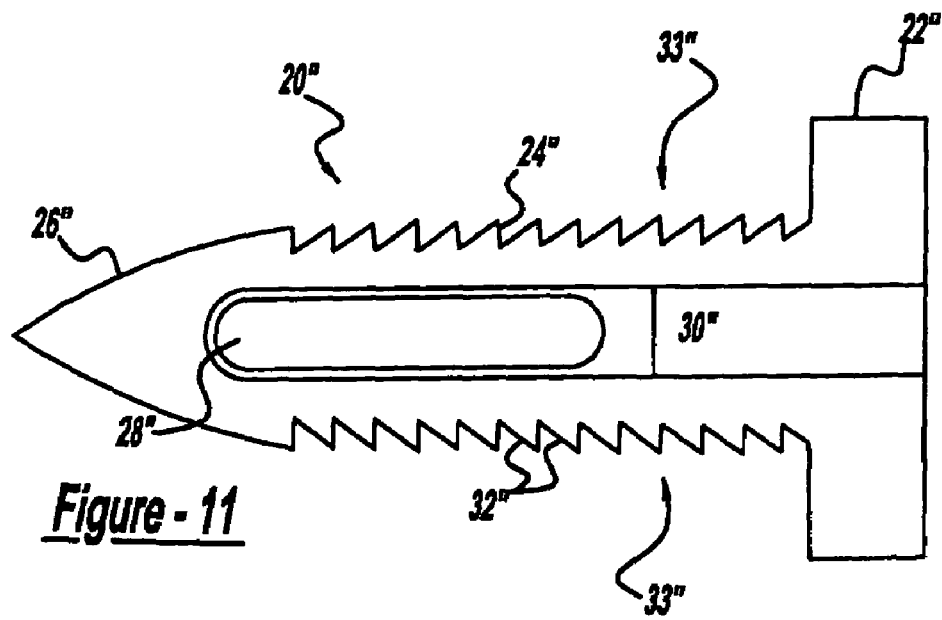
FIG. 11 is a side view of a third preferred embodiment of an explosive assisted fastener in accordance with the present invention.

A third exemplary embodiment of an explosive assisted fastener 20" is depicted in FIGS. 11–14. Referring to FIG. 11, the fastener 20" is primarily comprised of an integrally formed member having a head section 22", a stem section 24", a tip section 26", and an embedded explosive material 28". In addition, the fastener 20" includes a circular bore 30" which is formed in the head section 22" of the fastener 20". In this case, the bore 30" extends downwardly into the stem section 24", but does not substantially extend into the tip section 26" of the fastener 20". Thus, the explosive charge 28" is embedded in the stem section 24" of the fastener 20". In this embodiment, a plurality of raised ridges 32", formed by annular grooves 33", extend outwardly from the outer surface of the stem section 24". It is also envisioned that the stem section 24" may be comprised of a more ductile material than the remainder of the fastener.

Figure 14:
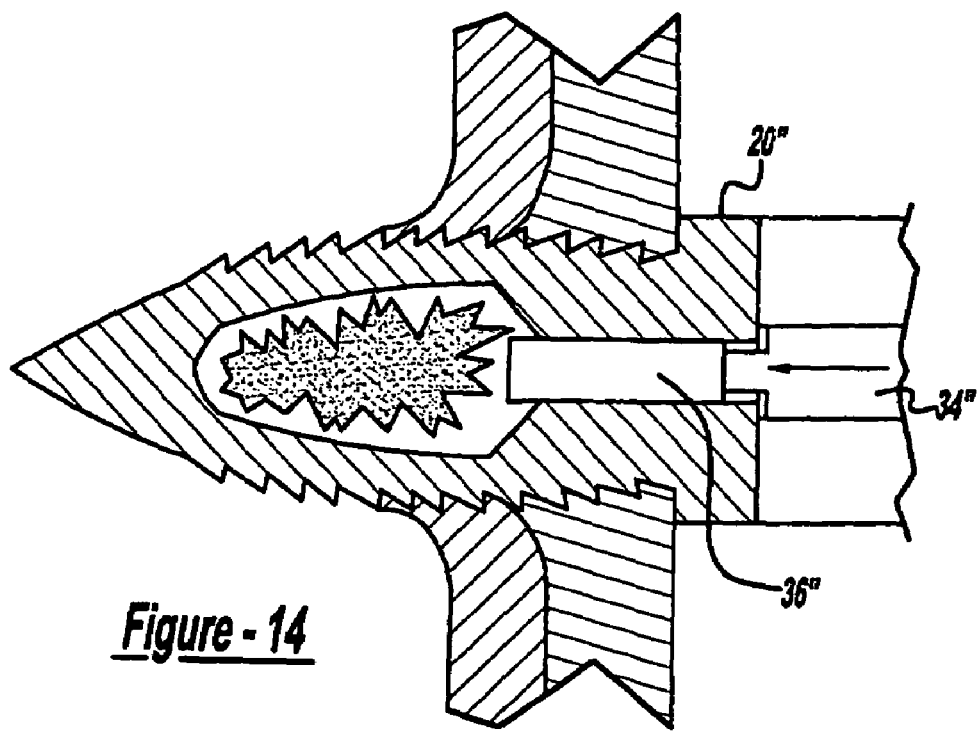
FIG. 14 is a cross-sectional view, taken along line 5—5 of FIG. 1, illustrating detonation of the explosive material embedded in the third preferred embodiment of an explosive assisted fastener in accordance with the present invention.
Figure 12:
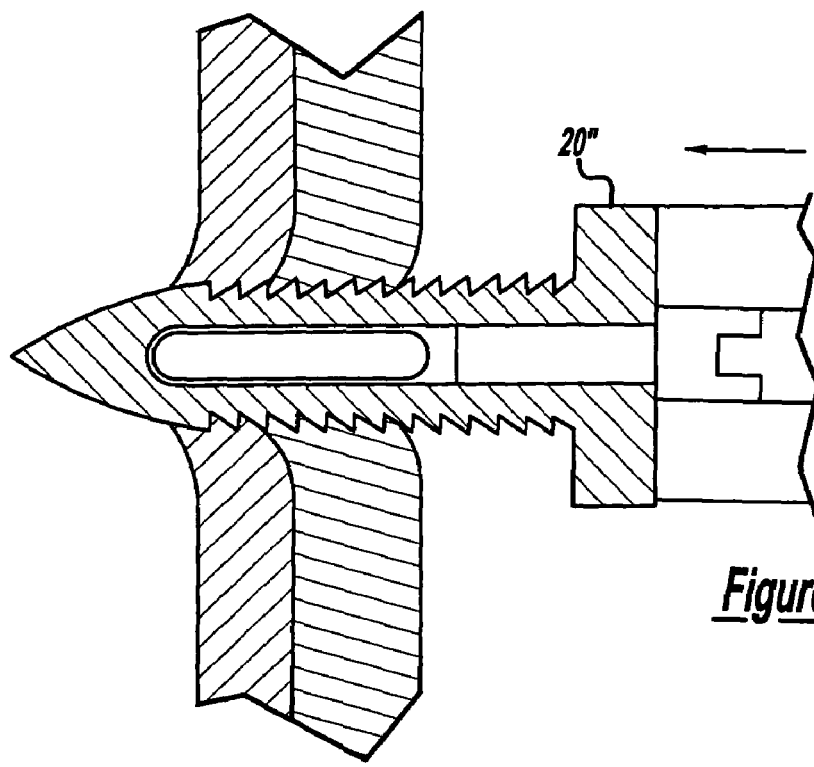
FIGS. 12 and 13 are cross-sectional views, taken along line 5—5 of FIG. 1, illustrating the third preferred embodiment of an explosive assisted fastener being driven through the steel members in accordance with the present invention.
Figure 13:
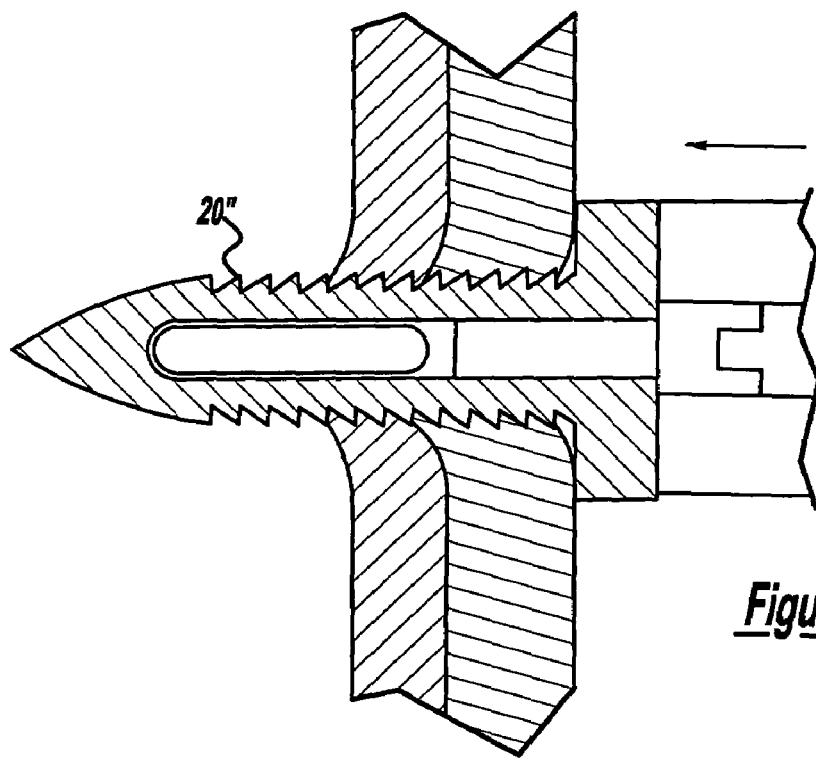

In operation, the explosive assisted fastener 20" is driven into the steel members until the head of the fastener seats against the outer surface of the steel members as shown in FIGS. 12 and 13. Once the fastener 20 has been driven into place, the embedded explosive charge 28" may be mechanically detonated as shown in FIG. 14. Specifically, a pin 34" is driven into the bore 30" and pushes a rod 36" into contact with the explosive material 28", such that the impact force of the pin 34" detonates the explosive material 28". As a result, the outer walls of the stem section 24" (adjacent to the explosion) expand outwardly into the adjacent surface of the framing members as shown in FIG. 14. The ridges 32" along the outer surface of the stem section 24" serve as teeth which prevent the removal of the fastener from the steel members.

While the invention has been described in its presently preferred form, it will be understood that the invention is capable of modification without departing from the spirit of the invention as set forth herein.

What is claimed is:

1. An explosive assisted fastener for joining framing members, comprising:
   an integrally formed member having a head section, a stem section and a tip section, wherein the head section is disposed at a first end of the stem section and adapted to be linearly driven by a driving device into the framing members, and the tip section is disposed at a distal second end of the stem section and adapted to pierce the framing members; and
   an explosive material embedded in the tip section of the fastener,
   wherein said tip section ruptures upon detonation of said explosive material.

2. The explosive assisted fastener of claim 1 further comprises a bore that is formed into the head section and extending through the stem section into the tip section of the fastener, such that the bore is adapted to receive a pin therein for mechanically detonating the explosive material residing in the tip section of the fastener.

3. The explosive assisted fastener of claim 1 wherein the tip section further includes one or more fractures to facilitate radially outward expansion of the tip section.

4. The explosive assisted fastener of claim 1 wherein the stem section is a cylindrical body having a plurality of annular grooves formed in an outer surface of the cylindrical body.

5. The explosive assisted fastener of claim 4, wherein the annular grooves are formed in the outer surface so as to extend beyond a back surface of the framing member furthest from the head section and form ridges that engage with the back surface and inhibit removal of the fastener.

6. The explosive assisted fastener of claim 5, wherein the plurality of annular grooves are formed along an entirety of the outer surface of the cylindrical body between the head section and the tip section.

7. The explosive assisted fastener of claim 1 further comprises a conductive material embedded in the fastener and electrically connected to the explosive material, thereby enabling detonation of the explosive material.

8. An explosive assisted fastener for joining framing members, comprising:
   an integrally formed member having a head section, a stem section and a tip section, wherein the head section is disposed at a first end of the stem section and adapted to be linearly driven by a driving device into the framing members, and the tip section is disposed at a distal second end of the stem section and adapted to pierce the framing members; and
   an explosive material embedded in the tip section of the fastener,
   wherein the tip section further includes one or more fractures to facilitate radially outward expansion of the tip section.

9. The explosive assisted fastener of claim 8, further comprising a bore that is formed into the head section and extending through the stem section into the tip section of the fastener, such that the bore is adapted to receive a pin therein for mechanically detonating the explosive material residing in the tip section of the fastener.

10. The explosive assisted fastener of claim 8, wherein the stem section is a cylindrical body having a plurality of annular grooves formed in an outer surface of the cylindrical body.

11. The explosive assisted fastener of claim 10, wherein the annular grooves are formed in the outer surface so as to extend beyond a back surface of the framing member furthest from the head section and form ridges that engage with the back surface and inhibit removal of the fastener.

12. The explosive assisted fastener of claim 11, wherein the plurality of annular grooves are formed along an entirety of the outer surface of the cylindrical body between the head section and the tip section.

13. The explosive assisted fastener of claim 8, further comprising a conductive material embedded in the fastener and electrically connected to the explosive material, thereby enabling detonation of the explosive material.

14. An explosive assisted fastener for joining framing members, comprising:
   an integrally formed member having a head section, a stem section and a tip section, wherein the head section is disposed at a first end of the stem section and adapted to be linearly driven by a driving device into the framing members, and the tip section is disposed at a distal second end of the stem section and adapted to pierce the framing members; and
   an explosive material embedded in the tip section of the fastener,
   wherein the stem section has a plurality of annular grooves formed in an outer surface of the stem section so as to extend beyond a back surface of the framing member furthest from the head section, the grooves forming ridges that engage with the back surface and inhibit removal of fastener.

15. The explosive assisted fastener of claim 14, further comprises a bore that is formed into the head section and extending through the stem section into the tip section of the fastener, such that the bore is adapted to receive a pin therein for mechanically detonating the explosive material residing in the tip section of the fastener.

16. The explosive assisted fastener of claim 14, wherein the tip section further includes one or more fractures to facilitate radially outward expansion of the tip section.

17. The explosive assisted fastener of claim 14, further comprising a conductive material embedded in the fastener and electrically connected to the explosive material, thereby enabling detonation of the explosive material.

18. The explosive assisted fastener of claim 14, wherein the annular grooves are formed along the entirety of the outer surface of the stem section from the head section to the tip section.

* * * * *